(No Model.)
J. F. MUNSIE.
CONDUIT FOR ELECTRIC CONDUCTORS.
No. 344,324. Patented June 22, 1886.
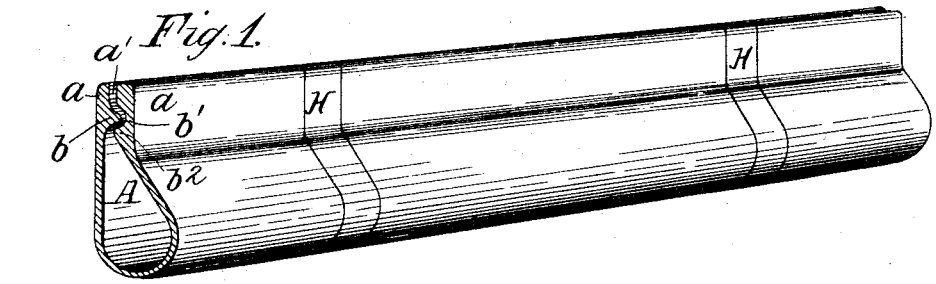
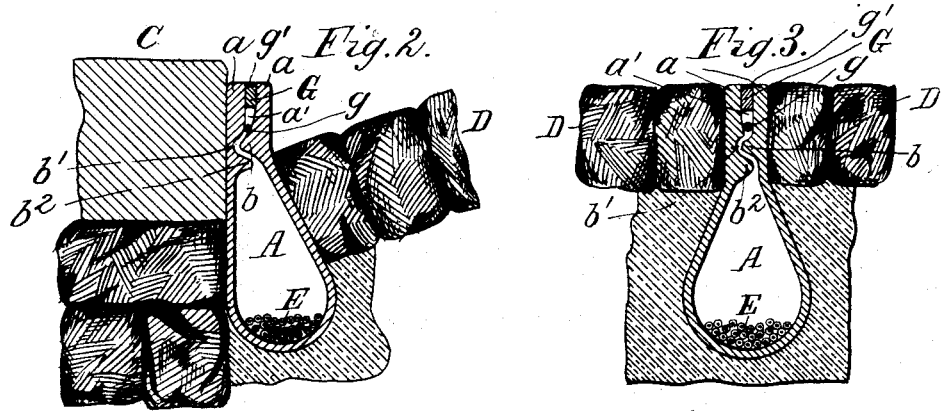
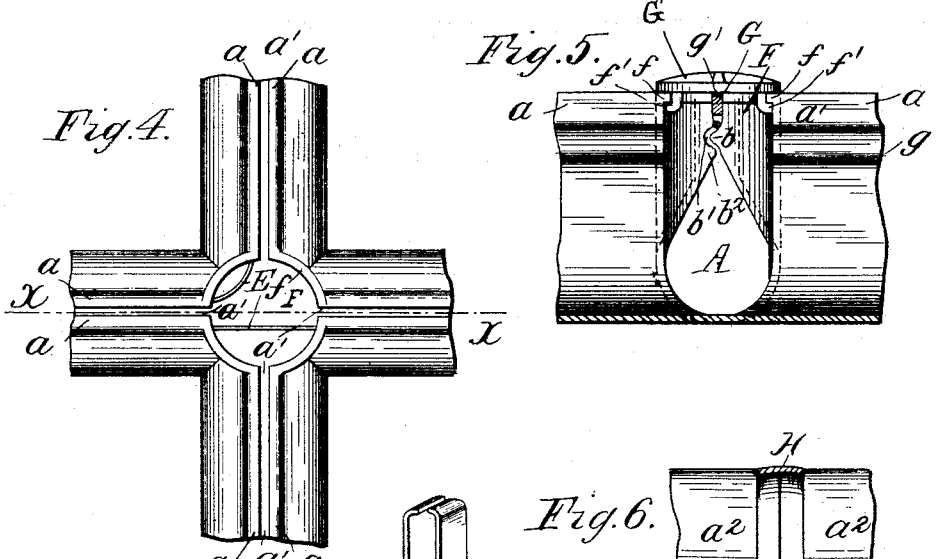
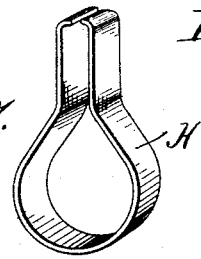
Witnesses.
Saml. B. Dover.
Massy Geddes
Inventor:
James F. Munsie.
by Geo. W. LeVin,
Attorney.

UNITED STATES PATENT OFFICE.

JAMES F. MUNSIE, OF CHICAGO, ILLINOIS, ASSIGNOR OF FIVE-TWELFTHS TO HORATIO N. MAY, OF SAME PLACE.

CONDUIT FOR ELECTRIC CONDUCTORS.

SPECIFICATION forming part of Letters Patent No. 344,324, dated June 22, 1886.

Application filed February 25, 1886. Serial No. 193,136. (No model.)

*To all whom it may concern:*

Be it known that I, JAMES F. MUNSIE, a British subject, residing at Chicago, in the county of Cook and State of Illinois, have invented certain new and useful Improvements in Conduits for Electric Conductors, of which the following is a full, clear, and exact description, reference being had to the accompanying drawings, and to the letters of reference marked thereon, which form a part of this specification.

My invention has for its object to provide a receptacle or conduit within which telephone, telegraph, or other electric wires or cables may be readily laid, and effectively retained in operative position above or below or upon the ground-level of streets or elsewhere, as may be desirable or necessary to meet the varying requirements and contingencies which present themselves in operating an electric system for any purpose in contradistinction to the employment of aerial wires, to such end, as will further appear, consisting in the matters hereinafter set forth, and pointed out in the appended claims.

To comprehensively illustrate my invention, I have shown in Figure 1 of the accompanying drawings a perspective view of my conduit, which, as a matter of preference, I construct of cast-iron, but which may be composed of any suitable material. In Fig. 2 is shown in transverse section the conduit containing electric wires E, laid in contiguity with the curbstone or outer edge of the sidewalk, the wire entering portion of the conduit projecting above the plane of the street-paving D. In Fig. 3 is shown in transverse section the conduit containing electric wires E, laid in the center or other portion of the street, with its wire entering portion extending to the level or plane of the street-paving D. In Fig. 4 is substantially shown the construction which I employ at the intersection of streets or elsewhere for carrying wires or cables in a direction or directions divergent from the main line of conduit or from the line upon which the same is primarily laid. In Fig. 5 is shown a vertical central section of the construction illustrated in said Fig. 4, the same being taken on the line *x x* thereof. In Figs. 6 and 7 is shown the means which I preferably employ for securing the sections of my conduit together when the same are constructed of cast-iron.

The main portion of the conduit preferably having substantially an oval configuration, is provided with a longitudinal slot or continuous opening, $a'$, through which the wires or cables to be laid are introduced to the interior thereof, said slot or opening being formed by the projecting or extended portions $a\ a$, as shown. Intermediate the outer extremities of said extended portions $a\ a$ and the interior A of the conduit, one of said portions $a$ is provided with a longitudinally-continuous lateral projection or lip, $b$, which extends athwart said slot $a'$ into a corresponding longitudinally-continuous groove or recess, $b'$, formed in the face of the opposite extended portion $a$, said last-mentioned portion being likewise provided with a longitudinally-continuous lateral projection or lip, $b^2$, which is extended across said slot below and in a direction converse to the lip $b$, the whole being so arranged as to form an irregular passage from the exterior to the interior of the conduit, through which wires or cables can be readily passed in laying the same, but effectually preventing their being interrupted or tampered with thereafter.

In the upper portion of the slot $a'$, I employ a closing-bar, G, of any suitable material, which is securely driven or fixed between the portions $a\ a$, said bar and the immediately contiguous surfaces of the conduit being coated with some bituminous or other suitable substance, $g'$, for securely sealing the conduit against the action of air, moisture, or water, which might otherwise enter therein through said slot. As an additional precautionary measure in this regard, I also locate within said slot $a'$, below said closing-bar G, a calking-rope, $g$, or equivalent device or material, which I coat with tar or other suitable substance.

At such points as it may become necessary to run main diverging or connecting or auxiliary wires or cables into buildings, or at an angle at street intersections or elsewhere, or where it may be desirable to locate points, for the purposes of this specification, termed "stations," from, through, or at which the wires or cables contained within the conduit can be readily reached for the purpose of testing or repairing the same, or for the purpose of connecting and laying additional wires or cables, a section of the conduit constructed substantially as shown in Figs. 4 and 5 is employed, said section being provided with a suitable number of diverging members or branches, and with a circular opening, F, to which is snugly fitted a cap, G', provided with devices for locking or fixing the same in position. The slot $a'$ being extended into the circular opening F, as shown particularly in Fig. 4, the cap G' overlaps the same for a sufficient distance, and is provided on its lower face with two or more downwardly-projecting L-shaped lugs $f'$, which, passing through said slot or slots as it is placed in position to engage with the under surface of the rim $f$ of the circular opening F as said cap is turned upon its seat, thereby locking it securely enough in position for all practical purposes. Other locking devices, however, not deemed necessary to be shown herewith, may be employed for further securing said cap in position, if desired.

To connectedly arrange the sections of my conduit, when composed of cast-iron, the ends of each section form beveled seats $a^2$, to which is rigidly adjusted a wrought-iron strap, H, having a configuration similar to that of the conduit, of which it practically becomes a part, said strap being expanded by heating and shrunk upon said seats $a^2$. The conduit being located in position, wires or cables to be laid therein are entered through the slot $a'$ into the interior A thereof, being likewise entered through said slot into the station or opening F, from which they may be entered and extended into and through the main line of conduit beyond said station or opening, or in any desirable direction into and through a diverging member or branch thereof, the calking-rope $g$, if employed, and the closing-bar G being afterward inserted in said slot, and the cap or cover to the opening F being located in position.

To lay additional wires for repairing or other purposes within the conduit after the same has been closed, it becomes necessary only to remove the calking-rope, if employed, the closing-bar G, and the cover or cap to the station or opening F.

To remove a defective wire or cable or section thereof from the conduit, the wire or cable, being severed or free at two points, is drawn through one of the stations F.

While I have shown and described the opening F to the station-section of circular form, with the cap or cover G' adapted to the configuration thereof and provided with special devices for locking the same in position, I wish to be distinctly understood as not limiting myself to any particular form of opening, F, or to any special arrangement of devices for locking the same in position, it being only essential that said opening into which is extended, for the purpose hereinbefore set forth, the longitudinal slot through which the wires are entered to the conduit, shall be of such form as will admit of access therethrough to the wires contained within said station, and that said opening shall be provided with a suitable cap or cover for securely closing the same.

Having thus fully described my invention, what I claim is new, and desire to secure by Letters Patent, is—

1. A conduit for electric wires or cables, provided with an irregularly-shaped longitudinal slot, $a'$, through which the wires or cables are entered to the interior of said conduit, substantially as shown and described.

2. The combination, with a conduit for electric wires or cables, provided with a longitudinal slot or opening, through which the wires or cables are introduced to the interior thereof, of a calking-rope, $g$, and a closing-bar, G, substantially as described.

3. The combination, with a conduit for electric wires or cables, provided with a longitudinal slot or opening, through which the wires or cables are introduced to the interior thereof, of one or more sections or stations, each provided with an opening, F, into which said slot is extended, and a cap, G', provided with devices for securing the same in position, substantially as and for the purpose described.

4. The combination, with a conduit for electric wires or cables, of the means for securing the sections thereof together, consisting of suitable seats, $a^2$, formed on the jointing ends of said sections, and the strap H applied thereto, substantially as and for the purpose described.

JAMES F. MUNSIE.

Witnesses:
GEO. W. LEVIN,
MASSY GEDDES.